(12) United States Patent
Schaade et al.

(10) Patent No.: US 11,470,557 B2
(45) Date of Patent: *Oct. 11, 2022

(54) METHOD, TELEPHONE, TELECOMMUNICATION SYSTEM AND DEVICE FOR CONTROLLING POWER CONSUMPTION OF A TELEPHONE

(71) Applicant: Unify GmbH & Co. KG, Munich (DE)

(72) Inventors: Stephan Schaade, Buchloe (DE); Christoph Schmid, Vienna (AT)

(73) Assignee: Unify GmbH & Co. KG, Munich (DE)

( * ) Notice: Subject to any disclaimer, the term of this patent is extended or adjusted under 35 U.S.C. 154(b) by 187 days.

This patent is subject to a terminal disclaimer.

(21) Appl. No.: 16/899,689

(22) Filed: Jun. 12, 2020

(65) Prior Publication Data

US 2020/0305085 A1 Sep. 24, 2020

Related U.S. Application Data

(63) Continuation of application No. 14/929,808, filed on Nov. 2, 2015, now Pat. No. 10,721,690, which is a (Continued)

(30) Foreign Application Priority Data

Sep. 24, 2008 (DE) .......................... 102008048468.7

(51) Int. Cl.
*H04L 12/66* (2006.01)
*H04M 3/22* (2006.01)
(Continued)

(52) U.S. Cl.
CPC ......... *H04W 52/0254* (2013.01); *H04L 12/12* (2013.01); *H04M 3/36* (2013.01);
(Continued)

(58) Field of Classification Search
CPC .............. H04L 12/12; H04M 3/42153; H04M 3/42178; H04W 52/0225; H04W 4/16; H04W 92/02; Y02B 60/30; Y02B 60/34
See application file for complete search history.

(56) References Cited

U.S. PATENT DOCUMENTS 6,128,104 A 10/2000 Okabe et al.
6,311,276 B1 10/2001 Connery et al.
(Continued)

FOREIGN PATENT DOCUMENTS

CN 169847 A 11/2005
JP 2005309751 A 11/2005
(Continued)

OTHER PUBLICATIONS

Written Opinion of the International Searching Authority for PCT/EP2009/006768 dated Feb. 10, 2010 (English Translation).
(Continued)

*Primary Examiner* — Hoang-Chuong Q Vu
(74) *Attorney, Agent, or Firm* — Buchanan Ingersoll & Rooney PC

(57) ABSTRACT

The invention relates to a method for controlling the power consumption of a telephone (10), (310). A power saving mode is automatically switched on or off for the telephone (10), (310), depending on: at least one given timespan, within which the telephone (10) is predicted not to be used or another terminal (380).

3 Claims, 7 Drawing Sheets

Related U.S. Application Data continuation of application No. 13/120,716, filed as application No. PCT/EP2009/006768 on Sep. 18, 2009, now Pat. No. 9,210,259.

(51) Int. Cl.
| | | |
|---|---|---|
| *H04W 52/02* | (2009.01) | |
| *H04L 12/12* | (2006.01) | |
| *H04M 3/42* | (2006.01) | |
| *H04M 3/36* | (2006.01) | |
| *H04M 7/00* | (2006.01) | |

(52) U.S. Cl.
CPC ..... *H04M 3/42153* (2013.01); *H04M 7/0084* (2013.01); *H04W 52/0216* (2013.01); *H04M 3/42178* (2013.01); *Y02D 30/70* (2020.08)

(56) References Cited

U.S. PATENT DOCUMENTS

| | | | |
|---|---|---|---|
| 6,345,047 B1* | 2/2002 | Regnier | H04L 12/6418 370/352 |
| 6,457,132 B1 | 9/2002 | Borgendale et al. | |
| 7,047,185 B1* | 5/2006 | Younes | H04W 52/28 455/524 |
| 7,565,181 B1 | 7/2009 | Hans et al. | |
| 2004/0082362 A1 | 4/2004 | Peng et al. | |
| 2005/0177627 A1 | 8/2005 | Vollmer et al. | |
| 2006/0019723 A1* | 1/2006 | Vorenkamp | H04W 52/0258 455/574 |
| 2006/0052079 A1 | 3/2006 | Eisholz et al. | |
| 2006/0116178 A1 | 6/2006 | Vuong et al. | |
| 2006/0141994 A1 | 6/2006 | Fratti et al. | |
| 2006/0210042 A1 | 9/2006 | Lee et al. | |
| 2007/0032225 A1 | 2/2007 | Konicek et al. | |
| 2007/0037610 A1* | 2/2007 | Logan | H04M 1/72448 455/574 |
| 2007/0188470 A1 | 8/2007 | Lee et al. | |
| 2007/0239317 A1 | 10/2007 | Bogolea et al. | |
| 2008/0102823 A1 | 5/2008 | Lee | |
| 2008/0112392 A1 | 5/2008 | Mansfield | |
| 2008/0165714 A1 | 7/2008 | Dettinger et al. | |
| 2008/0214228 A1 | 9/2008 | Bouchard et al. | |
| 2008/0220829 A1 | 9/2008 | Akama et al. | |
| 2008/0239978 A1* | 10/2008 | Karam | H04M 1/2535 370/465 |
| 2008/0253357 A1 | 10/2008 | Liu et al. | |
| 2009/0092091 A1* | 4/2009 | Balasubramanian | H04W 76/38 370/329 |
| 2009/0196281 A1* | 8/2009 | Kouchri | H04M 1/2535 370/352 |
| 2009/0319595 A1 | 12/2009 | Millmore et al. | |
| 2010/0004791 A1 | 1/2010 | West et al. | |
| 2010/0042855 A1 | 2/2010 | Karam | |
| 2011/0019555 A1 | 1/2011 | Gotch et al. | |

FOREIGN PATENT DOCUMENTS

| | | | |
|---|---|---|---|
| JP | 2005333410 | A | 12/2005 |
| WO | 2006103146 | A2 | 10/2006 |
| WO | 2008070252 | A1 | 1/2008 |
| WO | 2009100041 | A1 | 8/2009 |

OTHER PUBLICATIONS

International Preliminary Report of Patentability for International Searching Authority for PCT/EP2009/006768 dated Mar. 29, 2011 (German Translation).

International Preliminary Report of Patentability for International Searching Authority for PCT/EP2009/006768 dated Mar. 29, 2011 (EnglishTranslation).

Iternational Search Report for PCT/EP2009/006768 dated Feb. 10, 2010 (German Translation).

International Search Report for PCT/EP2009/006768 dated Feb. 10, 2010 (English Translation).

Written Opinion of the International Searching Authority for PCT/EP2009/006768 dated Feb. 10, 2010.

EPA: "Energy Star Program Requirements for Computers (Version 4.0)" Internet Citation Jan. 1, 2007 (Jan. 1, 2007), Seiten 1-20, XP002521775 Gefunden im Internet: URL:http://www.energystar.org.tw/pdf/Computer_Spec_Final.pdf> [gefunden am Mar. 31, 2009].

* cited by examiner

METHOD, TELEPHONE, TELECOMMUNICATION SYSTEM AND DEVICE FOR CONTROLLING POWER CONSUMPTION OF A TELEPHONE

CROSS-REFERENCE TO RELATED APPLICATIONS

This application is a continuation application of U.S. patent application Ser. No. 14/929,808, which is a continuation of U.S. patent application Ser. No. 13/120,716, which is the United States national phase under 35 U.S.C. § 371 of PCT International Application No. PCT/EP2009/006768 filed on Sep. 18, 2009, claiming priority to German National Application No. 10 2008 048 468.7 filed on Sep. 24, 2008.

BACKGROUND OF THE INVENTION

Field of the Invention

Embodiments relate to methods to control the power consumption of a phone, wherein a power saving mode is automatically switched on or off for the phone.

Background of the Related Art

For instance, it is common to switch a mobile phone display to power saving mode if no key has been pressed for a certain period of time. In this way, the operating life of a battery pack can be lengthened considerably.

There are, however, also phones operated in telecommunication systems and/or connected via a fixed line to a phone network or a data communication network. The telecommunication system can be a traditional telecommunication system for circuit-switched phone calls or an IP-phone system (IP) for IP-phones. A combination of both telecommunication systems is also possible.

A telecommunication system serves to switch phone calls, especially within the private area of a telecommunication system operator, e.g., a manufacturer or service company. Examples of telecommunication systems are for instance the HiCOM or HiPath systems by Siemens AG or Siemens Enterprise Communications.

For instance, one telecommunication system can have between three and several thousand subscribers connected. The telecommunication system implements a multitude of performance features that are known from public telecommunication system switching centers, e.g. call forwarding, conference calling, etc. Telecommunication systems, however, also offer speed dialing numbers, which are different from the public telecommunication network telephone numbers.

Embodiments may further include a telephone (10), wherein the telephone (10) comprises a voice input/output unit (158) and a control unit (154) designed to execute the following steps: for the telephone (10), initial data (72), (74) are automatically generated, indicating when the phone (10) is used, from the initial data (72), (74) it is automatically determined when the phone (10) is most likely to not be used and depending on the period of time determined, the power saving mode is switched on or off.

Embodiments may also include a programming unit (210) for data that indicates when at least one phone (10) is most likely not being used and with a control unit (204) that switches the power saving mode for the phone (10) on or off, depending on the programmed data.

Embodiments may include a telephone (10) comprising a voice input/output unit (158), a control unit (154) designed to execute the following steps automatically: recording of time periods, during which no user input occurs at the phone (10) and/or during which no prompt to the phone (10) is detected, comparison of the detected period of time with a default period of time (162), switching on the power saving mode for the phone (10), when the detected period of time is longer or equal to the default time period, wherein the phone is an IP phone connected to a data communication network via a communication cable.

In some embodiments a telephone comprises a voice input unit (158), a recording unit for data transmission via a communication distance (166) to the terminal device which is connected to the phone (10) and a control unit (154) designed to execute the following steps automatically: switching to and/or out of the power saving mode depending on a data stream from or to the terminal device (60).

A further embodiment includes a telecommunications system comprising a control unit (504) offering the alternative use of a phone (310) and terminal device (380) connected to the telecommunication system (352), wherein the control unit (504, 307) is designed to trigger the switching to or from power saving mode for the phone (10) depending on the usage of the terminal device (380).

A telecommunications system according to other embodiments of the invention may comprise a control unit (504), which offers the use of a phone (410) connected to a telecommunication system (452), an interface (484) to a data communication network (481) for a terminal device (480), which is being used by the user of the phone (410), wherein the control unit (504) is designed to trigger the switching on or off of the power saving mode depending for the phone (410) on the reception of a date from the data communication network (481) in the telecommunication system (452), wherein the date depends on the location of the terminal device (480).

Additional embodiments may include a telephone (10), telecommunication system (52), (352), (452) or device (70), (370), (470) comprising units to execute a method according to the embodiments set forth above.

BRIEF SUMMARY OF THE INVENTION

The method of controlling the power consumption of a telephone can be used depending on the following criteria:
  at least one default time period within which the phone will most likely not be used or
  another terminal that is different from the phone.

A combination of criteria in the method is also possible. By considering the stated criteria, the power saving function allows a more user-friendly design and can be more customized to the user's behavior. The method is easy to incorporate into the controls of the telecommunication system, especially in regard to phones operated on telecommunication systems.

The following steps can be taken:
  automatic generation of the initial data for the phone, indicating when the phone is likely to be used
  determination from the initial data when the phone most likely will not be used and
  automatic switching on of the power saving mode for the phone, for the time period determined in this manner.

In particular, a processor cycle of the phone or of parts of the phone can be reduced and/or parts that consume more power can be switched off or their functions reduced, e.g., a screen or other display unit.

This method is based on the concept that the respective user of a phone has a certain usage behavior which repeats itself on successive days and/or remains the same for certain days during successive weeks. Based on consistent behavior, it is possible to make a very accurate prognosis of the future usage of the telephone.

The automatic determination can be done within the phone, especially in case of an IP phone. IP phones in particular have a more complex control system than traditional landline phones, which can also perform the steps needed to execute the steps of this method.

It is also possible to enter two dates indicating when the phone most likely will not be used. The power saving mode of the phone is then switched on or off depending on these dates. The specification of the dates in particular occurs independently from any statistical analysis of the user's usage behavior.

The two dates can be centrally programmed for several phones or locally for each phone. The switching off dependent on the two dates can be controlled locally, i.e., in the phone or from a central point.

It is for possible for instance to predict with high probability that phones in companies will not be used during holidays or at night.

The initial data can be generated, depending on:
Operator input at the phone, i.e., especially pressing of keys and/or
incoming data for the phone 10, e.g., an incoming call and/or
data exchanged between a communication unit within the phone and another terminal device which is connected to this communication unit.

The aforementioned steps allow a probable assumption that the user of the phone is located near the phone at that moment and is using the phone or can use it.

Alternatively or cumulatively the time period can be assessed during which no user input is happening at the phone and/or no data is transmitted to or from the phone. The time period established in such a manner can be compared with a programmed time period which for instance can be programmed in a configuration by the user. When the detected time period is longer or equal to the programmed time period, the power saving mode for the phone can be automatically switched on. This measure is especially effective for power savings when combined with the other measures mentioned.

In the power savings mode, the brightness of a display can be dimmed and/or the display can be switched off. For instance, first the brightness is dimmed and after a certain length of time, in a second phase, the display unit is switched off.

For the phone, the power saving mode can be switched off automatically upon user input, when a call comes in or when a function of the terminal device connected via the phone is initiated. Switching on can be independent from the other time periods mentioned.

Another alternative or cumulative option is the coupling of the phone with a terminal device of a network. Depending on a data stream to or from the terminal device, the power saving mode of the phone can be automatically switched on or off.

In this case it is assumed that the usage of the terminal device indicates that the user stays in a location near the phone and is likely to use it, e.g., following the data transmission to the terminal device.

The phone, for instance, can contain a so-called mini-switch connected to the phone and the terminal device. The mini-switch is easy to monitor from the phone and easy to incorporate into the control system for the power saving mode. The mini-switch, for instance, transfers data packets by means of a so-called MAC address (Medium Access Control).

Alternatively, the phone can also be used by a user, i.e., instead of the terminal device. Collecting data on the usage of the terminal device can be automated. Depending on the collected usage data for the terminal device, the power saving mode for the phone can be turned on or off automatically.

For instance, the power saving mode is turned on, when the other terminal device is being used, because in this case it can be assumed that the phone is not being used at the same time. The power saving mode is again turned on, for instance, when the other terminal device is no longer being used.

The other terminal device can establish a connection to a telecommunication system, which also operates the phone. Via this connection, the terminal device is then able to log into the telecommunication system. Such a login mode is known as Soft Client, e.g., in connection with the telecommunication system HiPath 4000 or 8000. The data communication network between the telecommunication system and the terminal device is an IP network in particular (Internet Protocol) or the Internet itself.

The telecommunication system can also trigger the switching on or off of the power saving mode for the phone. For instance, the power saving mode is switched on for as long as the forwarding of incoming calls to the other terminal device is active.

Alternatively, the terminal device constitutes a terminal device of a data communication network. The control system of the data communication network can establish a connection to a telecommunication system, which also operates the phone. A date which depends on the location of the terminal device can be transmitted to the telecommunication system by the control system. The on/off switching of the phone's power saving mode can then be triggered depending on the date.

The date, for instance, indicates that the terminal device has left a data communication network also located in the area of the phone. In this case, it can be assumed that the phone will not be used in the near future. However, instead of referencing the whole data communication network, parts of that data communication network can be referenced. For instance, the phone can be switched to power saving mode when the terminal device is located in a different part of the data communication network than such a part of the data communication network that also is located in an area in where the phone is connected.

Specifically, the telecommunication system can trigger the switching to power saving mode, depending on the date. Alternatively, however, a device switched between the telecommunication system and the phone can also be used.

The data communication network can be a wireless data communication network, especially a WLAN (Wireless Local Area Network), i.e., a network according to standard IEEE 802.11 (Institute of Electrical and Electronics Engineers). Such data communication networks are already common in the market and are used increasingly by companies to cover their entire premises.

In addition, the terminal device can be operated as a terminal device of a cellular network, e.g., a GSM network (Global System Mobile), a UMTS network (Universal Mobile Telecommunications System) or a LTE network (Long Term Evolution). Terminal devices which can be operated in a wireless data communication network and in a cellular network are also called dual mode cellular devices. Solutions for the use of such dual mode cell phones are for instance known in connection with the "Mobile Connect" concept by Siemens AG.

The invention also concerns relates to a phone, a telecommunication system or a device containing a control unit which switches the phone or a phone automatically to power saving mode, depending on:

at least one programmed time period within which the phone is not used or most likely not being used or another terminal device.

Therefore, the aforementioned technical consequences for the method apply also to the phone, the telecommunication system, or the device or its further developments.

BRIEF DESCRIPTION OF THE FIGURES

In the following, examples of embodiments of the invention are explained based on the enclosed drawings. These show.

DETAILED DESCRIPTION OF THE INVENTION

These figures use the same reference symbols for the same technical characteristics. When the word "can" is used in this application, it refers to the technical characteristic actually implemented as well as to the possibility of such an implementation. The following explanations of the different embodiment examples serve for better understanding of the invention and are not to be used to limit the interpretation of the invention.

Figure 1:
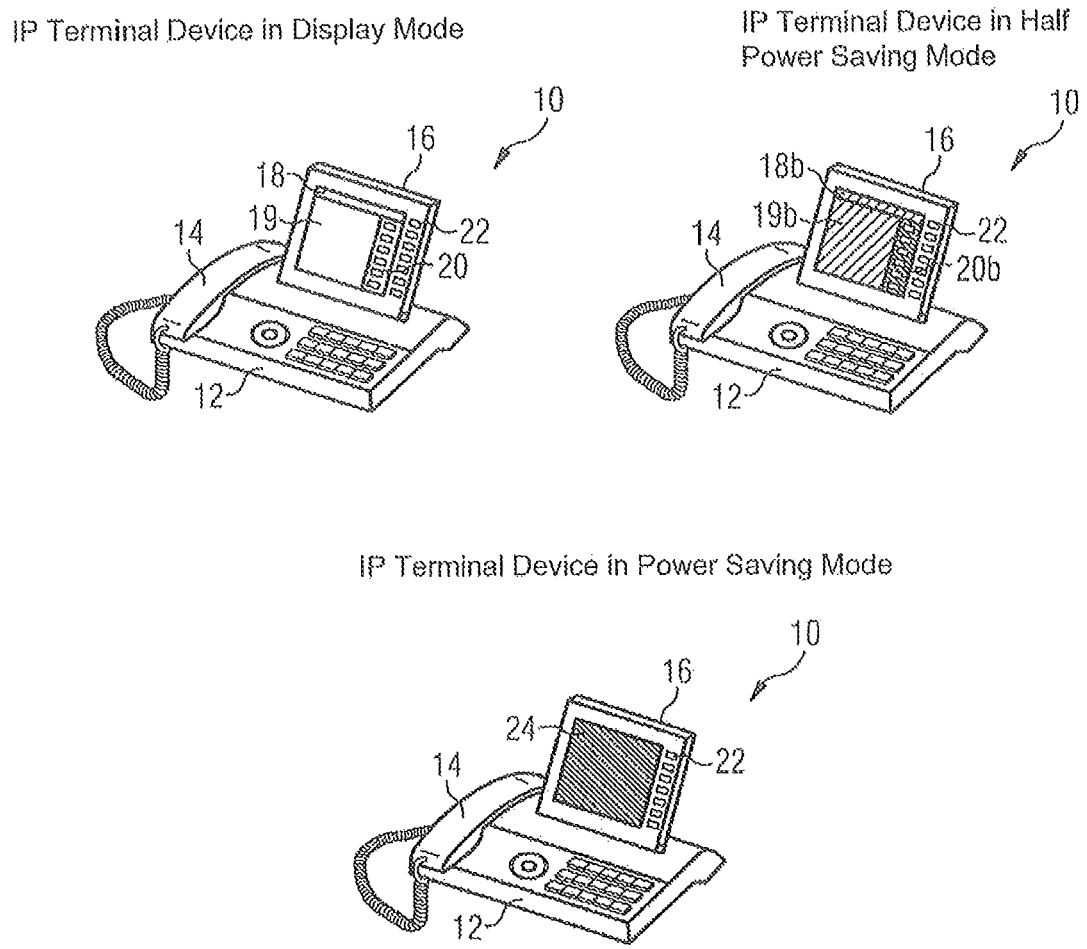
FIG. 1 Operating modes of an IP phone.

FIG. 1 shows operating modes of an IP phone 10. The phone 10 works according to internet protocol and contains:
a housing 12,
a receiver 14 with mouthpiece and speaker,
a screen 16.

In a display mode, a horizontal menu bar 18, a work area 19 and a vertical menu bar 20 are shown on the screen 16. The vertical menu bar shows the wiring of function keys 22 located on the right frame bar of the screen 16.

In a partial power saving mode the horizontal menu bar 18 and the work area 19 appear only with a reduced brightness, see menu bar 18b and work area 19b. The already very dark vertical menu bar 20 is no longer recognizable in semi-bright or partial power savings mode, see vertical menu bar 20b.

For instance, in the partial power saving mode, the brightness of the screen 16 is reduced, e.g., a 10 TFT screen (Thin Film Transistor) or a LCD display (Liquid Crystal Display).

In the power saving mode, the screen 16 of phone 10 is completely switched off, so that only a black area 24 is visible on the screen 16. Other functions of the phone 10 are, however, still available in this power saving mode, e.g., accepting a call or the input of connection requirements by pressing keys on the keyboard in the case 12 or the menu bar 20.

Figure 2:
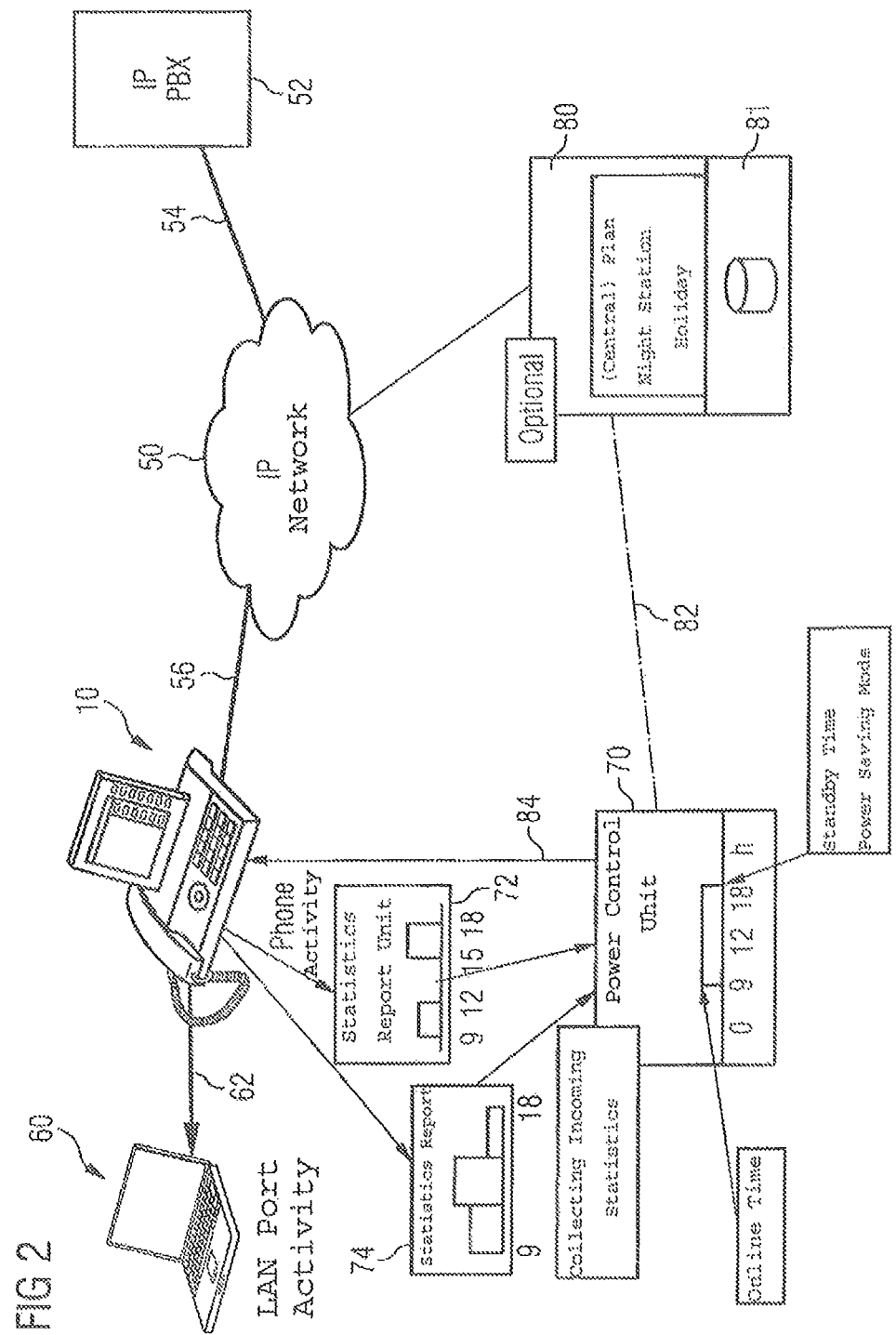
FIG. 2 A control system for a power saving mode of the IP phone depending on usage behavior, FIG. 3 Function components of an IP telecommunication system, FIG. 4 Function components of the IP phone, FIG. 5 Function components of an additional IP telecommunication system, FIG. 6 Units to implement a mobility-controlled power saving mode, FIG. 7 Units to implement a power saving mode depending on the location of a dual mode cellular phone FIG. 8 Function components of an IP telecommunication system, and FIG. 9 Function components of an IP phone.

FIG. 2 shows a control system for a power saving mode of phone 10 depending on usage behavior of the user of phone 10. An IP network 50 serves to connect the phone 10 via a connection 56. Also connected to network 50 is a telecommunication system 52, see connection 54. The telecommunication system 52, for instance, is a HiPath system from Siemens AG. The telecommunication system 52 serves to connect a multitude of IP phones from a company, wherein these IP phones are provided with a multitude of characteristics, e.g., call forwarding, company calling number, etc.

A notebook 60 or another computer is connected to phone 10 via a connection 62. In phone 10, for instance, a so-called mini-switch transfers data packets between the network 50 and phone 10 and the notebook 60, especially based on MAC addresses.

A power control unit 70 can be implemented as a component of the telecommunication system 52, as an independent unit or as a component of the IP phone 10. The function of the power control unit 70 is explained later on.

The power control unit 70 works in conjunction with a statistics unit 72 which collects data describing the usage of the phone 10 by the user. In particular, times when the phone 10 is used by the user and the times when phone 10 is not used by user are recorded. The embodiment assumes that the statistics unit 72 has determined that phone 10 is in use between 9:00 AM and 12:00 PM and 3:00 PM and 6:00 PM. The statistics units 72, 74 can also be implemented in the phone 10, independent from or in conjunction with the telecommunication system 52.

Optionally, the power control unit 70 can also work with a statistics unit 74 which collects the activity data of the notebook 60. In the embodiment the notebook 60, for example, is active between 9:00 AM and 6:00 PM.

The power control unit 70 uses the statistical data of the statistics units 72 or 74 to generate a total statistic according to which the user, according to embodiment, is near the phone 10 between 9:00 AM and 6:00 PM. Outside of this time period, the user is not near the phone, so that it may be switched to power saving mode or standby. The power control unit 70 triggers the switching on or off of the power saving mode, see "Standby Command" 84, for instance.

The granularity of the statistics units can be determined empirically; for instance, intervals considered depending on the available computing power intervals, e.g. in the range of 5 minutes to up to 2 hours, or in the range of 5 minutes to 15 minutes. If there is any usage within this interval, the power saving mode is not being activated. However, if there is no usage within this interval, the power saving mode is activated.

Alternatively or in addition, it is possible to include a programming unit 80 in the method, to program times during which the power saving mode is switched on, e.g., during night hours, on holidays, weekends, vacation time such as company-defined holidays or vacation of individual employees, etc. The programming unit 80, therefore, contains data storage 81 for this purpose. The programming unit 80 can be implemented centrally, e.g., as a unit independent from the phone 10 and the telecommunication system 52. The programming unit 80 can, however, also be integrated into the telecommunication system 52. As another alternative, the times mentioned may also be registered locally in the phone 10 and then incorporated by the power control unit 70.

Figure 3:
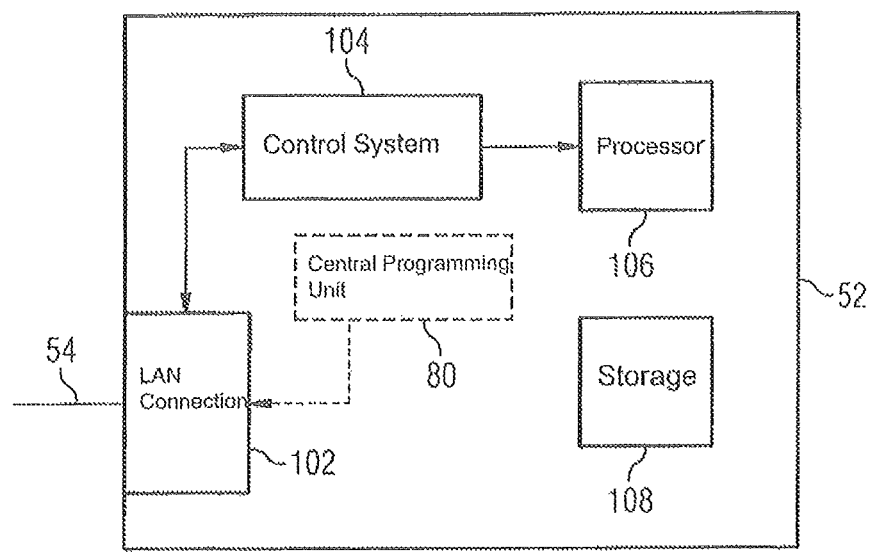

FIG. 3 shows function units of the IP telecommunication system 52. The telecommunication system 52 contains:
- a LAN connection 102,
- a control system 104,
- a processor 106 and
- storage 108.

The processor 106, for instance, executes a program stored in the memory 108, in order to generate the functions of control system 104. As an alternative, the telecommunication system 52 can be implemented strictly with switching functions, i.e., without programming.

If the power control unit 70 is located in the phone 10, the telecommunication system 52 has only indirect influence as far as the power saving mode is concerned, in as much as the phone 10 is connected to it and the available characteristics are implemented with control unit 104.

As already mentioned, the central programming unit 80 can also be contained in the telecommunication system 52.

In an alternative embodiment, an IP Centrex solution can be used, i.e., the functions of the telecommunication system 52 are provided by a unit on a public data communication network or telecommunication network, e.g., a switching center.

Figure 4:
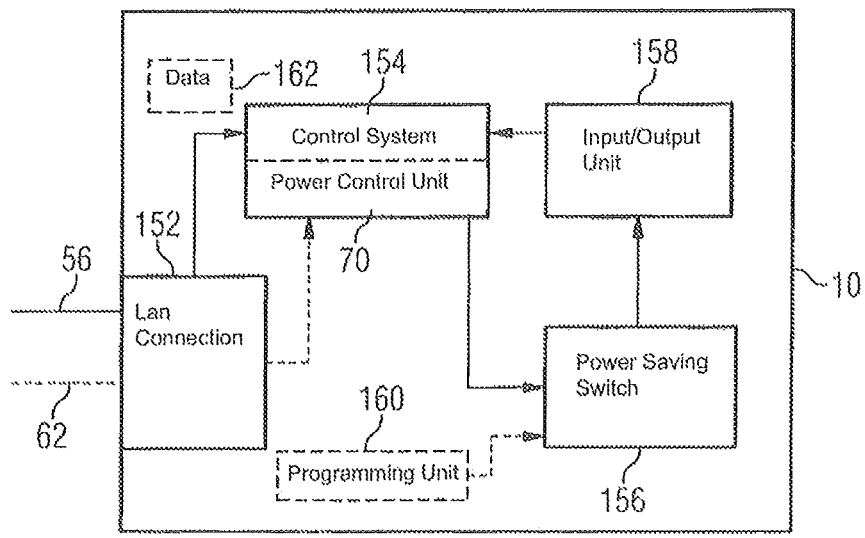

FIG. 4 shows function units of the IP phone 10. The phone 10 contains:
- a LAN connection 152,
- a control unit 154 which in turn can contain the power control system 70,
- a power saving switch 156 and
- an input/output unit 158, also containing the screen 16.

The LAN connection, among other things, serves as the connection 56 or 62. The power control 70 works together with the statistics units 72 and 74 not depicted in FIG. 4. The input/output unit 158 sends data depending on keys pressed and/or other input to the statistics units.

The power control 70 controls the power saving switch 156 depending on the data made available by the statistics units 72 and 74. The power saving switch 156 in turn directly affects the output unit 158, i.e., the screen 16 in the embodiment.

Another option for phone 10 is a programming unit 160 to program the time periods during which the power saving mode is to be activated, e.g., on weekends, holidays, during vacation, etc.

The functions shown in FIG. 4, for instance, can be achieved with software or with hardware alone. FIG. 4 also shows a date 162 which can indicate a time period, for instance, when the power saving mode is to be switched on, if no key is pressed or no other use of phone 10 occurs.

Figure 5:
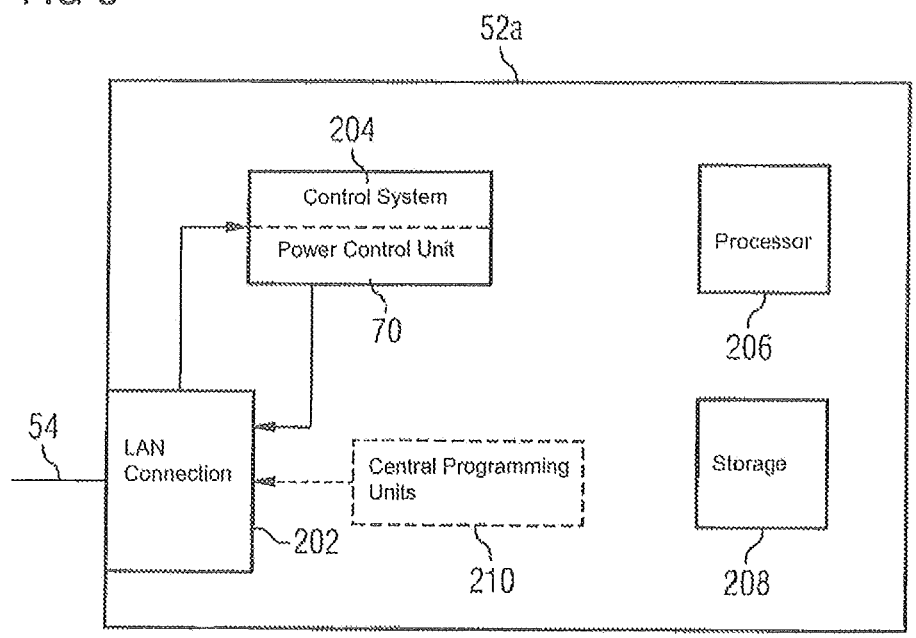

FIG. 5 shows function units of a telecommunication system 52*a*, which is structured like the telecommunication system 52, i.e., they comprise a LAN connection 202, a control unit 204, a processor 206 and storage 208. Contrary to telecommunication system 52, the telecommunication system 52*a* contains the power control system 70, among other things, for the phone 10. In this case, there is no power control system 70 contained in the phone 10. Also, the statistics units 72 and 74 are contained in the telecommunications system 52 (not depicted) and not in the phone 10. The power control unit 70 controls the phone 10 or the power saving switch 156 of the phone 10 directly via the LAN connection 202 and the connection 54.

The telecommunication system 52*a*, too, can optionally contain a central programming unit 210, whose functions equal those of the central programming unit 80. The function units shown in FIG. 5 can be implemented in the software or also with hardware alone.

In another embodiment the power control unit 70 can be implemented either outside the telecommunication system 52 or 52*a* or outside the phone 10. The power control unit 70 can, for example, access statistical data already stored at a central location, e.g., connection times, etc.

The recording of very short time periods during which no keys are pressed or the phone 10 is not used, see date 162 in FIG. 4, can also be implemented independently from the other power saving measures. The time period during which no key is to be pressed in order to activate the power saving mode can be shorter than 5 minutes, for example, or shorter than one minute, but in particular longer than 10 seconds, 20 seconds or 30 seconds.

In addition, data communication can take place via the mini-switch independent of the other power saving measures or it can be done in conjunction with them. For instance, the power saving mode 156 in phone 10 can be switched on, also when there is no data transfer via the connection 62. The power saving mode 156 is switched off when data is again transmitted via connection 62.

Figure 6:
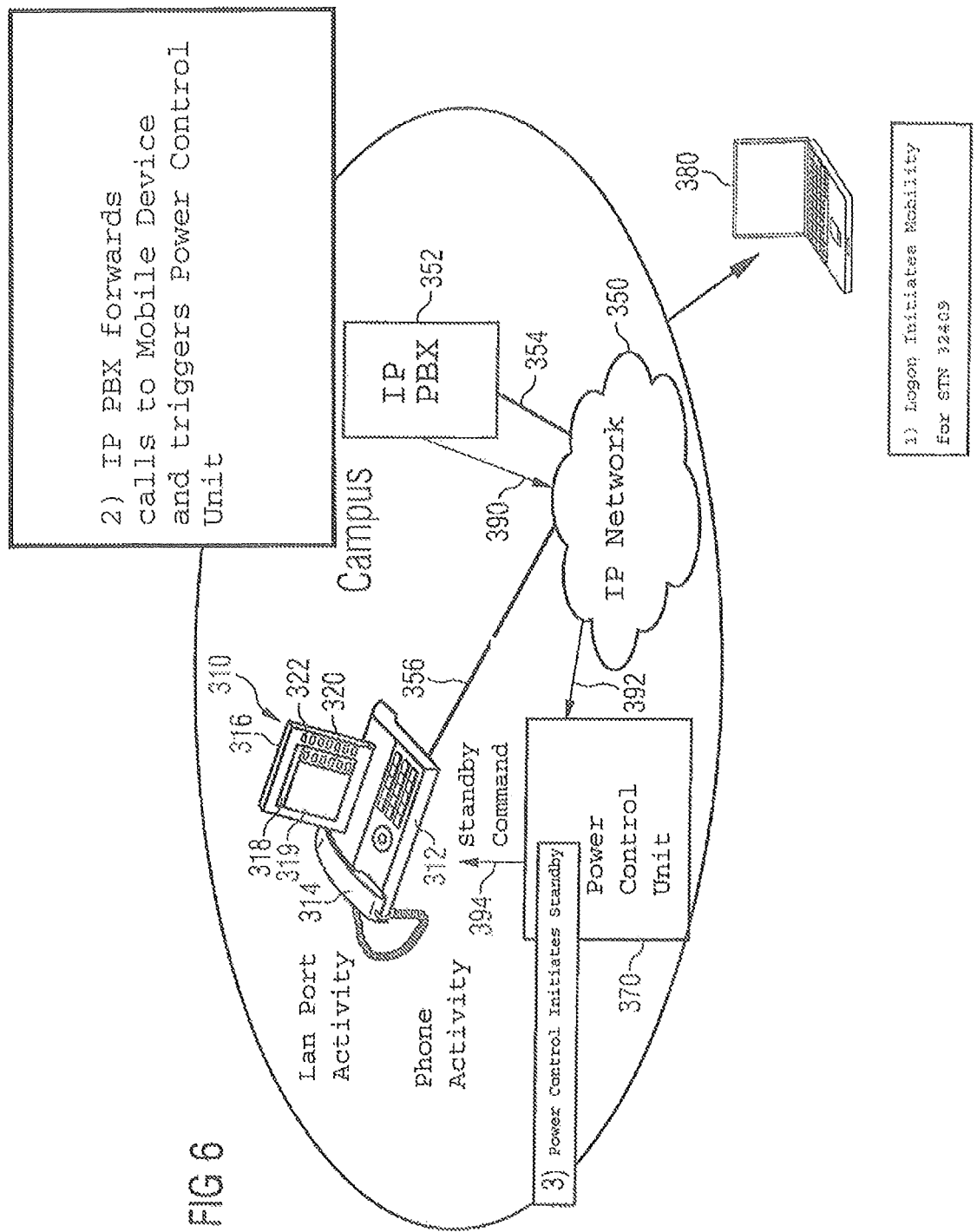

FIG. 6 shows units to implement a cellular-controlled power saving mode. An IP phone 310 comprises:
- a housing 312,
- a receiver 314 with mouthpiece and earpiece,
- a screen 316.

On the screen 316, for instance, a horizontal menu bar 318 is displayed. Also shown is a work area 319. A vertical menu bar 320 has been assigned to the function keys 322. The IP phone 310 can be switched to partial power saving mode or complete power saving mode, as explained above for the IP phone 10.

The phone 310 is connected via a connection 356 to an IP network 350, e.g., the local data communication network (LAN) of a company. Also connected to the IP network 350 is a telecommunication system 352, e.g., HiPath 8000, wherein the following functions have been added to the telecommunication system 352. The telecommunication system 352 is connected via connection 354 to the IP network 350.

A Notebook 380 or another computer can optionally be used instead of the phone 310, if the user of the phone 310 doesn't work in the office but at home, for example, in a so-called home office. The Notebook 380 is then connected with the network 350 via a connection 382.

In the basic situation the phone 310 is active and calls coming to the telecommunication system 352 are transferred to the phone 310. If the user of the phone 310 is working from home, however, he uses the Notebook 380 to log into the telecommunication system 352. The telecommunication system 352 then activates the call forwarding, to forward all calls coming to the telecommunication system 352 for that user, who also uses phone 310, are forwarded to the Notebook 380. It is assumed that the Notebook 380 contains phone software enabling the user to make calls.

In connection with the establishment of the call forwarding function, the telecommunication system 352 also sends a signal 390, 392 to a power control unit 370. The power control unit 370 switches the phone 310 to power saving mode, e.g., the screen 360 is turned off, see signal 394.

The power control unit 370 can be implemented in the switching center 352, as an independent unit, or as a component of the IP phone 310.

If the user of the Notebook 380 logs out because he is leaving his home office, for instance, the telecommunication system 352 forwards all incoming calls again to phone 310. In connection with the deactivation of the call forwarding to the Notebook 380, the telecommunication system 352 generates a signal 390, 392 for power control unit 370. Depending on the signal, the power control unit 370 then switches the phone 310 to operating mode and the power saving mode is inactive. Alternatively, turning on the screen 316 can also be done by pressing a key on the phone 310 or with an incoming call at phone 310.

Figure 7:
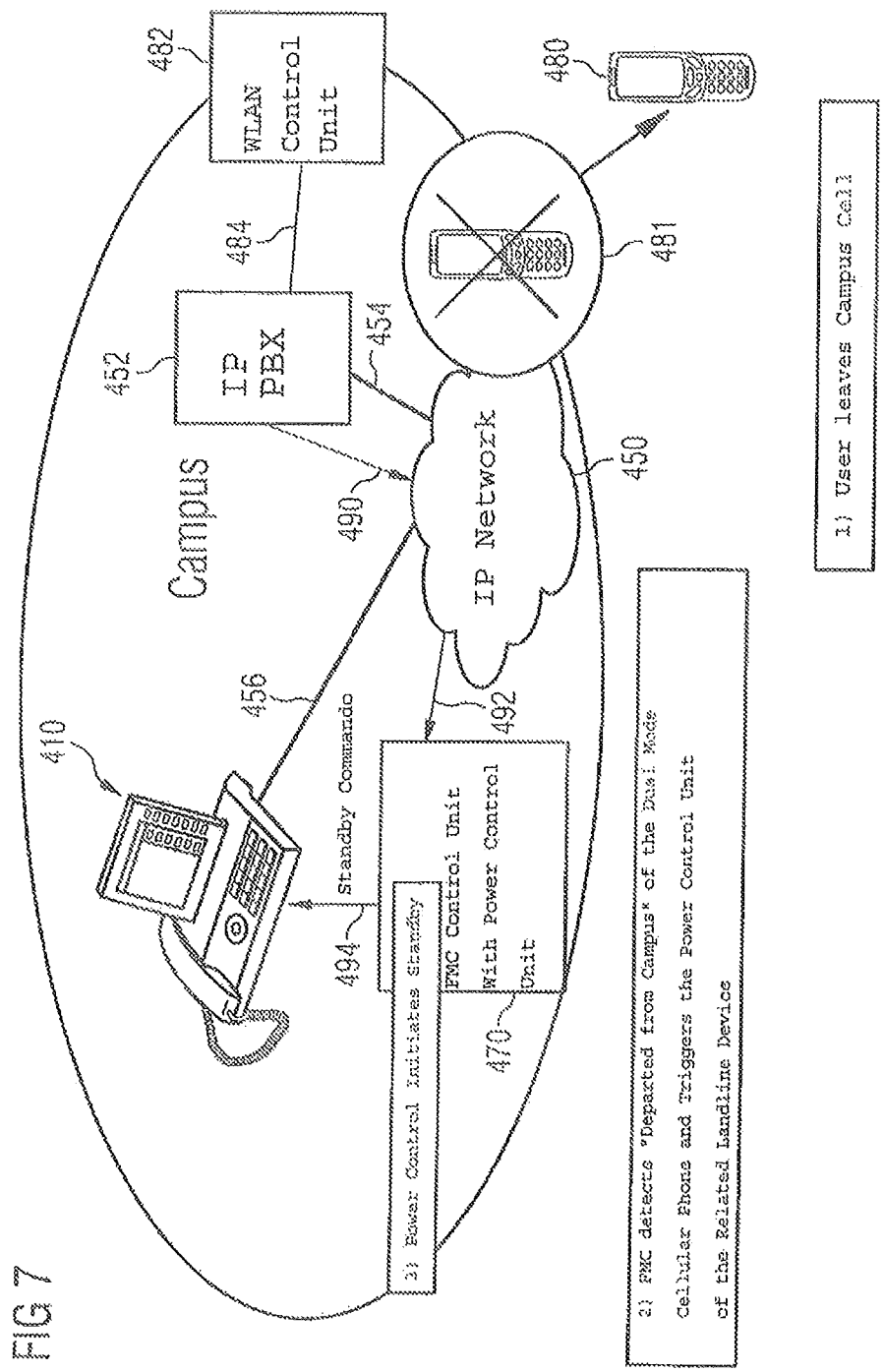

FIG. 7 shows units to implement a power saving mode depending on the location of a dual mode cellular phone 480. The scenario in FIG. 7 relates, for instance, to the area of a company which can also be called "campus." On the "campus" there are an IP network 450, for instance, a LAN. A telecommunication system 452 is connected to the network 450 with connection 454. The telecommunication system 452, e.g., can be a HiPath 8000 system from Siemens AG.

Also connected to the network 450 is an IP phone 410 which contains basically the same components as phone 310. The functions of the telecommunications system 452 and phone 410 which exceed the customary functions and regard the power saving mode will be discussed in detail below.

The "campus" also has a WLAN 481 which, for instance, only covers only a part of the "campus" or can cover the whole "campus." The WLAN 481 is controlled by a WLAN control unit 482. The WLAN control unit 482 is connected with the telecommunication system 452 via a connection 484. The connection 484, for instance, is a component of the network 450.

In a basic situation, in which the phone 410, for instance, has no active power saving mode, the user is located on the "campus" with his cellular phone 481 switched on. This has been relayed to the telecommunication system 452 by the WLAN control unit 482. If the user of the phone 410 and the dual mode cellular phone leaves the "campus", however, and takes the phone 480 with him, but not the phone 410, the WLAN control unit 482 detects this, because there is no longer contact with the cellular phone 480. The user can continue to use the cellular IP phone 480, for instance via a public cellular network, because calls coming in for him are forwarded accordingly, e.g., in a cellular network.

The WLAN control unit 482 notifies the telecommunication system 452 that the mobile phone 480 is no longer within the WLAN area 481 and thus no longer in the "campus" area. The telecommunication system 452 then signals a power control unit 470 (FMC-control unit, Fixed Mobile Convenience—optional or availability-dependent usage of "dual mode" equipment, e.g., WLAN/GSM) that the power saving mode can be switched on, see signal 490 and 492. The power control unit 470 then uses signal 494 to signal to the phone 410 that the power saving mode is to be switched on, i.e., that a screen 316 corresponding to the screen of the phone 410 will be dimmed or switched off.

The power control unit 470 can be implemented as a component of the telecommunication system 452, as an independent unit or as component of the phone 410.

When the user returns to the "campus", the WLAN 481 detects this and signals the WLAN control unit 482. The WLAN control unit 482 signals the telecommunication system 452 the arrival of the user and the latter then can switch off the power saving mode, see signal 490, 492, 494. The on/off switching of the phone 410 can, however, also be accomplished simply at the first press of a key on the phone 410 or an incoming call for the phone.

The steps shown in FIGS. 6 and 7 can also be implemented in a combination in a telecommunication system 452, so that the power saving mode is switched on depending on the usage of the home office and depending on the departure from the company grounds.

Figure 8:
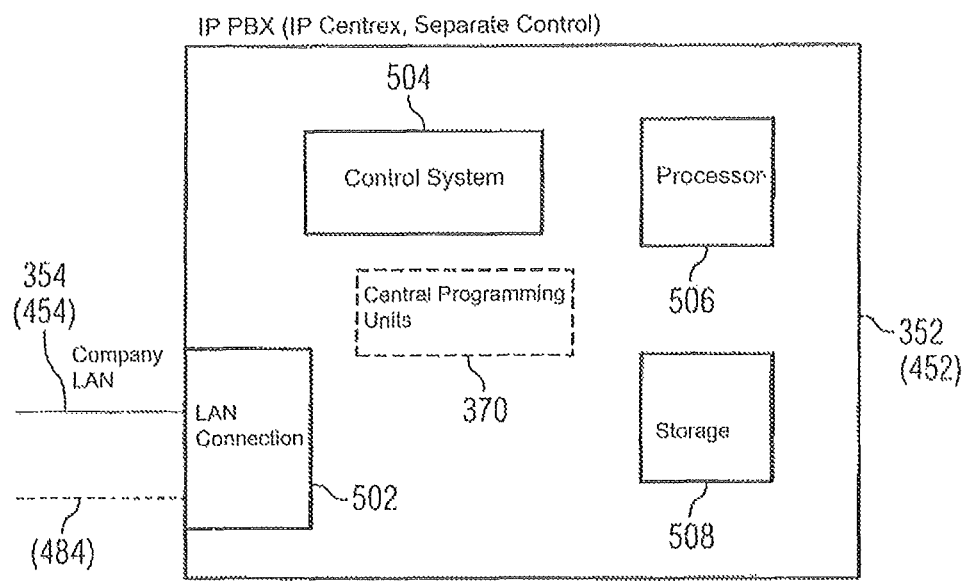

FIG. 8 shows function units of the telecommunication system 352. The telecommunication system 352 comprises:
a LAN connection 502 which is connected by the connection 454,
a control system 504,
a processor 506 and
storage 508.

The control system 504, for instance, is implemented with a program stored in storage 508, which is executed by the processor 506. As an alternative, the functions of the control system 504 can also be provided without using a program.

The control system 504 provides the basic functions of the telecommunication system. The control system 504 also provides the functions mentioned in FIG. 6 in connection with the activation or deactivation of the power saving mode for the phone 310.

Included in the basic functions of the telecommunication system 352 is the connection of a multitude of phones of the company network, the provision of functions like call forwarding, conference calling and administration of internal company numbers for these phones. As an option, the power control unit 370 can also be included in the telecommunication system 352.

However, the functions of the telecommunication system 352 can also be provided with an IP Centrex solution of a public data communication network unit or a public telecommunication network. Alternatively, the control functions relating to the power saving mode can also be provided in an independent unit, i.e., independent of the telecommunication system 352 or the phone 310.

The telecommunication system 452 comprises the same units as the telecommunication system 352. It is, however, also connected to the WLAN control unit 482 via the connection 484.

Figure 9:
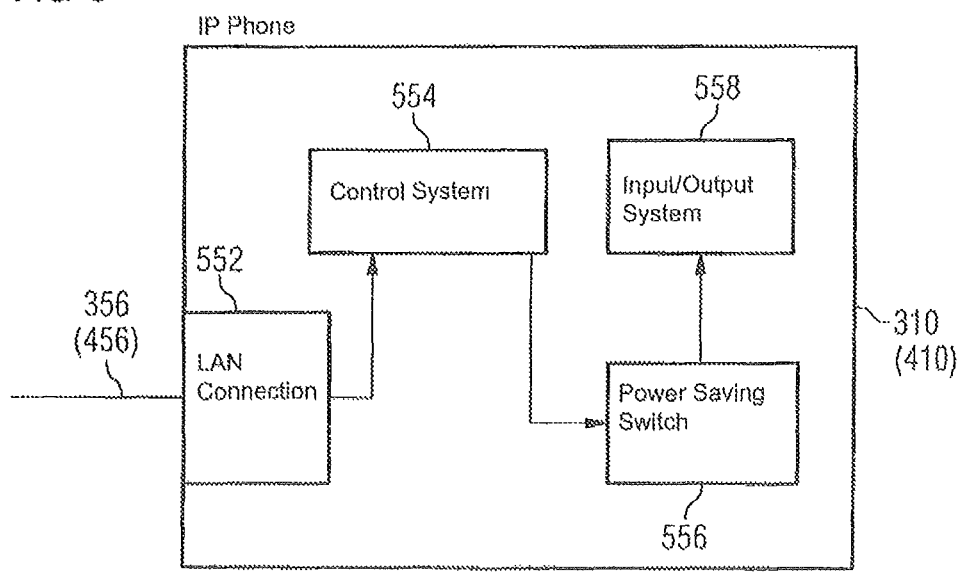

FIG. 9 shows the function units of the IP phone 310 or 410. The phone 310 or 410 comprise:
a LAN connection 552,
a control system 554,
a power saving switch 556 and
an on/off switch 558.

The control system 554 provides the basic functions of the phone 310 or 410, e.g., by using a processor and a program which has been saved in storage of the phone 310 or 410. In addition, the phone 310 or 410 provides the functions mentioned above in FIGS. 6 and 7, in connection with the on/off switching of the power saving mode. The power saving mode is switched with the power saving switch 556, wherein the power saving switch 556 controls the input/output unit 558, i.e., especially the display unit 316 of the phone 310 or the display unit of the phone 410.

The IP phones 10, 310, 410 are preferably connected by cable to the respective IP network. Also, there is a power cord that can be connected to a power transformer which can be plugged into an electrical outlet or power strip. The phones, devices, and telecommunication systems can be implemented with software or also with hardware alone.

In other words, a method is provided to automatically reduce the power consumption in IP terminal devices. Depending on the technology used or the requirements for high-resolution graphics, IP terminal devices, their processor and interfaces have a high power consumption.

In contrast to PCs, cable-connected phones usually don't have a standby mode since phones based on technical traditions have always been kept fully operational at all times.

The described solution shows the possibility of reduced power consumption during times when the IP terminal device is not being used also. For this purpose, an evaluation of the user interface and the data stream of the IP terminal device is used:

a) Evaluation of the user interface: As soon as the user does not call up any functions via the user interface or PC or when there is no call up or action at the IP terminal device for a certain period of time (which is configured in the menu "Settings"), the screen will be switched to power saving mode, meaning that first the brightness of the screen is dimmed and after a user-specified period of time, the terminal device will switch the screen off completely. When the terminal device is used again or if a function of the IP terminal device is called upon via a connected PC, the screen will automatically be switched back to display mode.

b) Evaluation based on the data stream of the IP terminal device: As soon as the IP terminal device or a terminal device connected to it processes a data stream (e.g., during a phone call, surfing of the internet, download of data, etc.) the screen is automatically switched to display mode.

c) Automation based on behavior: Evaluation of statistically recorded time periods, derived from the behavior of the end user. In this context, a unit located either in the equipment or in a central unit detects the past user behavior and switches the equipment into operational or standby-mode based on the experience (e.g., for an office workstation where active usage between 8:00 AM and 6:00 PM has been detected, the standby mode will automatically be activated between 6:10 PM and 7:50 AM).

d) Optionally, a central unit may switch terminal devices of a certain group to standby mode. This makes sense especially at night, during holidays and on weekends.

The result is a considerable reduction in the power consumption of IP terminal devices during time periods when IP terminal devices are not being used. Assuming an average usage time of four hours per day, the power savings would be approximately 84 percent per terminal device. Using a power consumption of 6 Wh (Watt hours) and assuming 20 hours of standby mode, 120 Wh (Watt hours) can be saved per day and terminal device.

Using the automation based on behavior as described in c), the noticeable consequences of the power saving mode for the user are minimal.

Terminal devices can be equipped with the power saving automation or the power saving automation can be provided in a central unit, e.g., a telecommunication system.

In other words, it still holds true that a method is provided to reduce the power consumption of stationary IP communication devices with a cellular control system. IP terminal devices, due to the technology used or requirements for high-resolution graphics, have a high power consumption for display, processor and interfaces. At the same time, the mobility requirements of today's users are increasing. A consequence of this development is that with the use of mobile functions, e.g., the use of IP Soft Clients with the same call number as a phone or the integration of a dual mode cellular phone (e.g. Siemens "Mobile Connect" solution), the absence of a user from an IP communication unit eliminates the necessity of the concurrent operation of an IP phone.

It is also the case here that phones, as opposed to PCs, usually don't have a standby mode since phones based on technical traditions have always been kept fully operational at all times. This means that when mobile functions are clearly being used by the end user, the IP terminal device in the office continues to consume full power.

The described solution also shows the possibility of reduced power consumption during those times when a mobile function is used concurrently:

a) HFA (HiPath Feature Access) mobility: In this case, the user owns an IP Soft Client working with the same call number as the landline phone. Usually, when the Soft Client is started, the communication system is notified and consequently the forwarding or switching off of the

The invention claimed is:

1. A method to control power consumption of a phone, comprising:
   recording activity data relating to usage of the phone by a user associated with the phone;
   monitoring non-reception related factors of phone usage, the non-reception related factors comprising at least one of log-in status of the user, an empirical usage history of the phone by the user, and a location of the user;
   assessing the recorded activity data relating to usage of the phone by the user to estimate time ranges for non-use of the phone by the user, the estimated time ranges being time ranges that correspond with identified time ranges of empirical non-use of the phone based on recorded activity of prior days of use and non-use of the phone;
   communicating with the phone to switch the phone to a power saving mode for the estimated time ranges of non-use of the phone so that the phone is switched into the power saving mode during each of the estimated time ranges;
   monitoring a call forwarding status for the phone;
   upon a determination that the call forwarding for the phone is activated so that calls directed to the phone are forwarded to another device, switching the phone to the power saving mode;
   monitoring a switch of the phone for transferring data packets between a first terminal device to which the phone is connected and a network to which the phone is connected;
   upon determining that no data is being transferred between the network and the first terminal device, switching the phone to the power saving mode; and
   wherein the power saving mode causes at least one of a brightness of a display unit of the phone to be dimmed and the display unit to be switched off.

2. The method of claim 1, further comprising:
   determining whether the user is attempting to use the phone while the phone is in the power saving mode;
   upon a determination that the user is attempting to use the phone, triggering a switching off of the power saving mode so the phone is no longer in the power saving mode;
   determining whether the phone is no longer in use for a predetermined period of time;
   upon a determination of the phone no longer being in use for the predetermined period of time, switching the phone to the power saving mode.

3. The method of claim 2, further comprising:
determining that a day is a predefined holiday or vacation day;
upon determining that the day is the predefined holiday or vacation day, automatically switching the phone to the power saving mode.

\* \* \* \* \*